United States Patent
Boes et al.

[11] Patent Number: 5,972,826
[45] Date of Patent: Oct. 26, 1999

[54] DENSIFIED CARBON BLACK ADSORBENT AND A PROCESS FOR ADSORBING A GAS WITH SUCH AN ADSORBENT

[75] Inventors: Ralph Ulrich Boes, Concord, Mass.; Douglas M. Smith; Ranjan Ghosal, both of Albuquerque, N. Mex.

[73] Assignee: Cabot Corporation, Boston, Mass.

[21] Appl. No.: 08/591,607

[22] PCT Filed: Mar. 28, 1995

[86] PCT No.: PCT/US95/03806

§ 371 Date: Feb. 1, 1996

§ 102(e) Date: Feb. 1, 1996

[87] PCT Pub. No.: WO95/26812

PCT Pub. Date: Oct. 12, 1995

[51] Int. Cl.[6] .............. B01J 21/18; B01J 20/02; C01D 3/00

[52] U.S. Cl. ............ 502/174; 502/180; 502/416; 502/418; 502/430; 502/432; 502/435; 502/515; 423/449.1

[58] Field of Search .............. 502/174, 180, 502/416, 418, 430, 432, 435, 515; 423/449.1

[56] References Cited

U.S. PATENT DOCUMENTS

| | | | |
|---|---|---|---|
| 2,317,026 | 4/1943 | Brown, Jr. | 252/268 |
| 2,843,874 | 7/1958 | Wood | 18/1 |
| 3,979,330 | 9/1976 | Munzner et al. | 502/416 |
| 4,029,600 | 6/1977 | Schmitt, Jr. et al. | 502/416 |
| 4,081,370 | 3/1978 | Schmitt, Jr. et al. | 210/39 |
| 4,225,463 | 9/1980 | Unger et al. | 502/416 |
| 4,256,720 | 3/1981 | Kallenberger | 423/449.1 |
| 4,316,938 | 2/1982 | Slusarczuk et al. | 428/403 |
| 4,490,160 | 12/1984 | Yuki et al. | 502/416 |
| 4,491,609 | 1/1985 | Degel et al. | 502/416 |
| 4,636,375 | 1/1987 | Rothbuhr et al. | 423/449.1 |
| 4,972,658 | 11/1990 | Greenbank | 502/416 |
| 4,980,106 | 12/1990 | Vogel | 264/102 |
| 4,999,330 | 3/1991 | Bose et al. | 502/402 |
| 5,094,736 | 3/1992 | Greenbank | 502/416 |
| 5,204,310 | 4/1993 | Tolles et al. | 502/416 |
| 5,206,207 | 4/1993 | Tolles | 502/424 |
| 5,212,144 | 5/1993 | Schwartz, Jr. | 502/423 |
| 5,238,470 | 8/1993 | Tolles et al. | 502/416 |
| 5,272,126 | 12/1993 | Ichikawa et al. | 502/416 |
| 5,292,707 | 3/1994 | Aparicio et al. | 502/418 |
| 5,393,821 | 2/1995 | Shieh et al. | 423/449.1 |
| 5,456,750 | 10/1995 | Mackey et al. | 423/449.1 |
| 5,527,518 | 6/1996 | Lynum et al. | 423/449.1 |

FOREIGN PATENT DOCUMENTS

| | | | |
|---|---|---|---|
| 218403 | 4/1987 | European Pat. Off. | F17C 11/00 |
| 360236 | 3/1990 | Germany | C09C 1/60 |

OTHER PUBLICATIONS

Mallhaupt et al., "Carbon Adsorbents for Natural Gas Storage", International Carbon Conference, Jun. 21–26, 1992.

*Primary Examiner*—Mark L. Bell
*Assistant Examiner*—Patricia L. Hailey

[57] ABSTRACT

The present invention discloses an adsorbent comprising a densified carbon black. The densified carbon black comprising the adsorbent preferably has an increase in density of from about 100% to about 500% above the undensified form of the adsorbent. The densified carbon black adsorbent has an increase in adsorption capacity per unit volume over the undensified form of the adsorbent in excess of 100%. The densified carbon blacks are particularly useful as adsorbents for gases.

31 Claims, 1 Drawing Sheet

DENSIFIED CARBON BLACK ADSORBENT AND A PROCESS FOR ADSORBING A GAS WITH SUCH AN ADSORBENT

BACKGROUND OF THE INVENTION

The present invention relates to an adsorbent comprising a densified carbon black, and a process for adsorbing a gas with such an adsorbent.

The adsorption of gases is an important component of many industrial processes. The extent of adsorption is dependent on the ability of the adsorbent to contain the gas. The effectiveness of an adsorbent may be judged from several criteria, depending on the application. The adsorption capacity of the adsorbent may be expressed in terms of the adsorption per unit mass of the adsorbent, or in terms of the adsorption capacity per unit volume of the adsorbent. For some applications, such as the adsorptive storage of natural gas, space is a constraint, and so the adsorption capacity per unit volume of the adsorbent is the criterion for measuring its effectiveness. Thus, a good adsorbent should have a high adsorption capacity both on a unit mass basis, as well as on a unit volume basis. The adsorption capacity per unit volume of adsorbent is dependent on the adsorption capacity per unit mass, as well as the bulk density of the adsorbent material. Thus, increasing the bulk density of the adsorbent will cause an increase in adsorption capacity per unit volume of the adsorbent.

A number of carbon adsorbents have been investigated in the past. For example, Mullhaupt, et al., "Carbon Adsorbents For Natural Gas Storage", International Carbon Conference, Jun. 21–26, 1992, discloses the use of active carbon as a methane adsorbent, as well as the use of certain carbon blacks as methane adsorbents.

U.S. Pat. No. 4,999,330 to Bose, et al., describes a densified carbonaceous material for use as a methane adsorbent. As disclosed in this patent, while there is an increase in the density of the adsorbent of from 50% to 200%, the corresponding increase in the adsorption capacity per unit volume of the adsorbent ranges from about 20% to about 100%.

It is, therefore, an object of the invention to provide a densified carbon black that exhibits an adsorption capacity per unit volume superior to that shown by undensified carbon blacks.

It is a further object of the invention to provide a process for using such a densified carbon black as an adsorbent for gases.

SUMMARY OF THE INVENTION

The present invention meets these and other objects by providing new adsorbents comprising densified carbon blacks. Upon densification, the carbon blacks preferably have an increase in adsorption capacity per unit volume in excess of 100% or more, up to 400% or more, as compared to an undensified carbon black.

The "carbon black" referred to in this invention may be any carbon black, e.g., furnace black, thermal black, lamp black, acetylene black, or a carbon black manufactured by any other means, including carbon black that is formed as a by-product in a process whose primary product is not carbon black. Preferably, the carbon black is a furnace carbon black.

The present invention also provides a process for adsorbing a gas with a densified carbon black adsorbent.

DETAILED DESCRIPTION OF THE INVENTION

Figure 1:
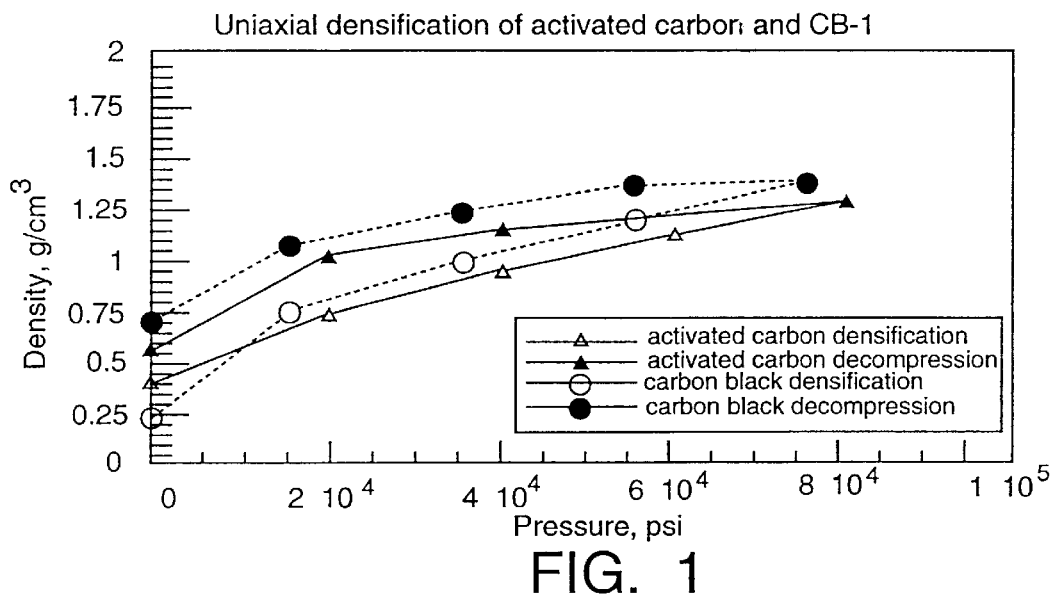
FIG. 1 is a plot showing uniaxial densification curves for a carbon black, CB-1, and an activated carbon having a nitrogen BET surface area (SA) of 2050 m²/g.

When densification is carried out on carbon black as described below, there is a substantial increase in adsorption capacity per unit volume of the carbon black. One important application of densified adsorbents is in the adsorptive storage of natural gas, the efficacy of the adsorbent being measured by the adsorption capacity for methane, per unit volume of adsorbent, at a specified pressure and room temperature. The adsorption capacity per unit volume of adsorbent can be calculated by $$V_v = (V_w)(d)$$

where $V_w$ is the adsorption capacity of the material per unit mass of adsorbent, and d is the density of the adsorbent pellets. On densifying the material, the density d is increased, and so the adsorption capacity per unit volume, $V_v$, also increases.

The carbon black may be densified by any one of several densification techniques known in the prior art. One way of compressing the carbon black particles is by the application of pressure uniformly in all directions (isostatic densification). For example, the carbon black particles may be densified in a pin pelletizer. The pin pelletizer relies on capillary forces from a wetting fluid, (usually, but not necessarily, water) to densify the carbon black particles and form pellets. Typically, a measured quantity of water is added to a known quantity of carbon black in a pin pelletizer, and the resulting mixture is agitated. The rolling motion of the pins and capillary forces due to the wetting fluid cause the formation of pellets.

Some other types of equipment which may be used for isostatic densification in the densification of carbon black include, but are not restricted to, drum pelletizers and disc pelletizers. Operation of such equipment is well known to those skilled in the art, and particularly in the carbon black industry.

Another means of densification of carbon black is by application of pressure in one direction only (uniaxial densification). This technique is commonly used in various fields e.g. catalysis and pharmaceuticals, among others. This may be achieved, for example, by the following procedure. A known mass of carbon black is carefully loaded into a die. For the specific procedure considered here, a steel die of circular cross-section with an internal diameter of 0.5 inches was used. A plunger of the same external diameter as the internal diameter of the die is inserted into the die and the combination is inserted between the platens of a hydraulic press. Force is applied on the plunger until the desired pressure is exerted on the carbon black within the die. For the present procedure, 0.4 gm of carbon black was subjected to a force of about 20,000 lbs. (corresponding to a pressure greater than 100,000 psi in the 0.5 inch diameter die) for a period of three hours. At the end of the constant pressure period, the pressure is gradually reduced and the pellet removed from the die. The volume of the pellet can be calculated from the height of pellet and the diameter of the die. From the weight and the volume, the density of the pellet may be calculated.

Table 1 lists several furnace carbon blacks studied for the purposes of demonstrating the present invention, along with the physical properties of these blacks.

TABLE I

Properties of some carbon blacks.

| Furnace carbon black | DBP | Iodine No. | CTAB | BET $N_2$S. A. $m^2/g$ |
|---|---|---|---|---|
| BLACK PEARLS ® 2000 carbon black | 330 | 1412 | 750 | 1500 |
| CB-1 | 232 | 669 | 1021 | 1756 |
| CB-2 | 340 | 655 | 1057 | 1936 |
| CB-3 | 284 | 754 | 1081 | 1976 |
| CB-4 | — | 1353 | — | 1896 |

Carbon Black Analytical Properties

The CTAB of the carbon blacks was determined according to ASTM Test Procedure D3765-85.

The iodine absorption number ($I_2$No.) of the carbon blacks was determined according to ASTM Test Procedure D1510.

The nitrogen surface area ($N_2$SA) of the carbon blacks was determined according to ASTM Test Procedure D3037-Method A.

The dibutyl phthalate absorption value (DBP) of the carbon was determined according to ASTM Test Procedure D3493-86.

For BLACK PEARLS® 2000 furnace carbon black, manufactured and sold by Cabot Corporation, the density ranged between about 0.1 and 0.15 g/cm³ before densification, and this increased to between 0.27 g/cm³ and 0.3 g/cm³ after isostatic densification in a pin pelletizer. The density attained by BLACK PEARLS® 2000 carbon black after uniaxial densification, as described above, ranged between 0.45 and 0.6 g/cm³. Similarly, the density of another furnace black, designated herein as CB-1, before densification and after uniaxial densification, changed from between 0.1 and 0.15 g/cm³, to between 0.6 and 0.75 g/cm³, respectively.

FIG. 1 shows uniaxial densification curves for an activated carbon powder having a nitrogen BET surface area of 2050 m²/gm (hereinafter the activated carbon), and the CB-1 carbon black. Clearly, the activated carbon does not densify as well as the CB-1 carbon black. Though the initial density of the carbon black is lower than that of the activated carbon, the final density of the CB-1 carbon black at the end of the densification—decompression cycle is higher than that of the activated carbon.

Table 2 shows the condition of the two materials at various stages in the uniaxial densification experiment. The percentage increase in density after densification is about 96% for the activated carbon, compared to an increase of greater than 400% for the CB-1 carbon black. It was observed that while the activated carbon did not retain any semblance of shape and became a powder almost immediately after removal from the die, the CB-1 carbon black retained a pellet shape after removal from the die. The point to be noted here is that after decompression, the carbon black has a much higher density than exhibited by the activated carbon. Thus it may be assumed that the difference between the structures of the activated carbon and the carbon black is responsible for the inherently superior densification behavior of carbon black.

TABLE 2

Data from uniaxial densification experiment for activated carbon and CB-1 carbon black (numbers in brackets show the percentage increase over the undensified material).

| Stage in densification cycle | activated carbon | CB-1 carbon black |
|---|---|---|
| Before loading material into die | density = 0.3 g/cm³ | density = 0.14 g/cm³ |
| Material in die before densification begins | density = 0.42 g/cm³ [40%] | density = 0.25 g/cm³ [79%] |
| Maximum densification (at 80,000 psi) | density = 1.23 g/cm³ [310%] | density = 1.33 g/cm³ [850%] |
| Material in die at the end of densification cycle | density = 0.59 g/cm³ [96%] | density = 0.72 g/cm³ [414%] |
| Material removed from die | Does not retain shape, crumbles into powder | Cylindrically shaped pellet is obtained |

Several specific non-limiting examples of gas adsorption are set forth in Examples I and II. Examples I and II describe the adsorption of nitrogen at 77° K., carbon dioxide at 273° K., methane at 298° K. and butane at 273° K. These Examples, carried out with different gases under different conditions of temperature and pressure, demonstrate the general applicability of densified carbon black as an adsorbent. Example III demonstrates the use of several different densified carbon blacks as adsorbents to show that any carbon black can be densified as described herein for use as an adsorbent. Thus, it should be understood that the invention is in no way restricted to the specific examples herein, and that the examples serve only to illustrate the usefulness of the invention.

EXAMPLE I

Enhancement of the Adsorption Properties of BLACK PEARLS® 2000 Carbon Black Through Densification Table 3 shows the adsorption properties of BLACK PEARLS® 2000 carbon black as determined by the adsorption of various gases under different conditions of temperature and pressure, on a unit volume basis.

TABLE 3

Adsorption properties of undensified and densified BLACK PEARLS ® 2000 carbon black per unit volume of material (numbers in brackets show the percentage increase over the undensified material)

| Adsorption property per unit volume (cm³) carbon | Undensified ("fluffy") (Density = 0.12 g/cm³) | Densified isosotatically in a pin pelletizer (density = 0.29 g/cm³) | Densified uniaxially (density = 0.6 g/cm³) |
|---|---|---|---|
| BET surface area, m²/cm³ carbon | 175.2 | 437 [149%] | 900 [414%] |
| Micropore volume, cm³/cm³ carbon | 0.1158 | 0.2799 ]142%[ | 0.579 [400%] |
| Methane adsorption capacity at 298° K. and 35 atm., cm³ STP/cm³ carbon | 20 | 49 [145%] | 102 [410%] |

From the above Table 3, the following can be observed in connection with the ability of a densified carbon black to adsorb nitogen, carbon dioxide and methane gases:

1) BET surface area: The adsorption of nitrogen at 77° K. is commonly used as a technique for determining the surface area of a carbon black. This may be done in accordance with ASTM Test Procedure D3037-Method A. The BET surface area is widely used by those skilled in the art as a criterion for judging the usefulness of a material as an adsorbent. The higher the BET surface area, the better the adsorption qualities of the adsorbent for nitrogen at 77° K. The surface area may be expressed in $m^2/gm$, or $m^2/cm^3$ of adsorbent. As stated previously, the objective here is to increase the surface area per unit volume of the adsorbent. Table 3 shows data for the BET surface area of BLACK PEARLS® 2000 carbon black before densification, and after densification using isostatic densification or uniaxial densification. From the data shown in Table 3 it is clear that the surface area per unit volume of the carbon black increases after densification. Thus the densification process is highly beneficial to the adsorption properties of the carbon black, and shows that nitrogen is adsorbed in an increased amount.

2) Micropore volume from $CO_2$ adsorption at 273° K.: The adsorption of carbon dioxide at 273° K. is indicative of the adsorption behavior of gases that are close to their critical temperature. It is also possible to calculate the micropore volume of the carbon black by applying an adsorption theory to the carbon dioxide adsorption data. In this instance, the micropore volume was determined using the method of Dubinin and Astakhov as found in M. M. Dubinin, *Progress in Surface and Membrane Science*, Vol. 9, edited by Cadenhead, et al., Academic Press, New York (1975). Table 3 shows the micropore volume per unit volume of carbon black, both before and after isostatic or uniaxial densification. It is clear from Table 3 that the micropore volume available in a unit volume of adsorbent increases after densifying the carbon black. This indicates that the amount of $CO_2$ adsorbed, per unit volume, is increased upon densification of the carbon black, since the quantity of $CO_2$ adsorbed is directly proportional to the micropore volume.

3) Adsorption of methane at 298° K.: One of the important future application for adsorbents is the use of such adsorbents to store natural gas for automobiles and other applications. The usefulness of the adsorbent stems from the fact that the same quantity of natural gas that is stored in a tank devoid of adsorbent at high pressures, on the order of 3000 psi, can be stored at considerably lower pressures in the range of 500–1000 psi by utilizing a tank filled with adsorbent. To gauge the suitability of an adsorbent for the storage of natural gas, the adsorption of methane is commonly carried out in the laboratory. Since natural gas consists primarily of methane, the adsorption capacity of methane can be used to gauge the performance of the adsorbent for natural gas storage applications.

Densification of the adsorbent assumes great importance for natural gas applications because the usefulness of the adsorbent is determined by measuring the quantity of methane that can be delivered by the adsorbent, per unit volume of the storage tank. The higher the density of the adsorbent, the smaller the volume of the storage tank required to accommodate a particular mass of adsorbent. Thus, if two materials have the same adsorption capacity for methane per unit weight of the adsorbent (i.e. they have the same specific adsorption), the material with a higher density will have a higher adsorption capacity per unit volume of adsorbent.

Figure 2:
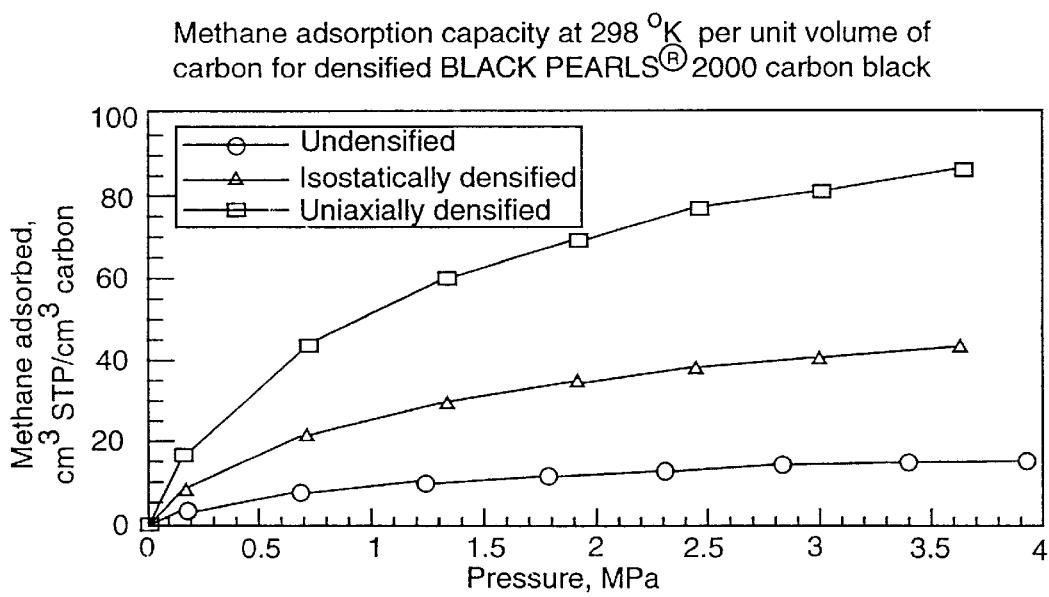
FIG. 2 is a plot showing the methane adsorption capacity per unit volume of undensified, isostatically densified, and uniaxially densified carbon blacks.

FIG. 2 shows methane adsorption isotherms at room temperature for BLACK PEARLS® 2000 carbon black based on unit volume of adsorbent for the undensified black with a density of 0.12 $g/cm^3$, the black isostatically densified in a pin pelletizer with a density of 0.29 $g/cm^3$, and the black densified by uniaxial densification, with a density of 0.6 g/cm3. As illustrated in FIG. 2, the adsorption capacity per unit volume of the densified carbon black increases substantially over that of the undensified carbon black. It is therefore clear that the increase in density of the carbon black as described herein, translates directly into an increase in adsorption capacity per unit volume of the adsorbent.

EXAMPLE II

Adsorption of Butane on CB-1 Carbon Black at 273° K.

The adsorption of butane at 273° K. was carried out on the CB-1 carbon black to establish the suitability of densified carbon blacks for the adsorption of larger gas molecules, such as normal alkanes. The quantity of butane adsorbed at a pressure of 549 Torr was used as a measure of the effectiveness of the CB-1 black as an adsorbent for larger gas molecules. Table 4 shows the change in adsorption capacity of the CB-1 black per unit volume of adsorbent, before densification and after uniaxial densification. As the data set forth in Table 4 clearly show, the adsorption capacity for butane per unit volume of the adsorbent increases after densification.

TABLE 4

Adsorption capacity of CB-1 carbon black for butane, before and after densification (numbers in brackets show the percentage increase over the undensified material)

| Adsorption property per unit volume ($cm^3$) carbon | Undensified ("fluffy") (density = 0.14 $g/cm^3$) | Densified uniaxially (density = 0.72 $g/cm^3$) |
|---|---|---|
| Butane adsorption capacity of CB-1 at 549 Torr and 0° C., $cm^3$ STP/$cm^3$ carbon | 34 | 184 [441%] |

EXAMPLE III

Adsorption of Gases on Different Types of Undensified and Densified Carbon Blacks Example III considers the adsorption of gases on several different carbon blacks before and after densification to show that the present invention is applicable to using any densified carbon black as an adsorbent.

Table 5 shows the BET surface areas as determined from nitrogen adsorption at 77° K., for several carbon blacks. Table 5 shows the BET surface area per unit volume, before and after densification. The BET surface area per unit volume of all the carbon blacks listed in Table 5 show significant increases after densification.

TABLE 5

BET surface area for various densified and undensified carbon blacks (numbers in brackets show the percentage increase over the undensified material)

| Carbon black | BET surface area, $m^2/cm^3$, carbon, undensified | BET surface area, $m^2/cm^3$, carbon, densified uniaxially |
|---|---|---|
| BLACK PEARLS ® 2000 carbon black | 175 (density = 0.12 $g/cm^3$) | 900 [414%] (density = 0.6 $g/cm^3$) |

TABLE 5-continued

BET surface area for various densified and undensified carbon blacks (numbers in brackets show the percentage increase over the undensified material)

| Carbon black | BET surface area, m²/cm³, carbon, undensified | BET surface area, m²/cm³, carbon, densified uniaxially |
|---|---|---|
| CB-1 | 260 (density = 0.12 g/cm³) | 1289 [396%] density = 0.72 g/cm³ |
| CB-4 | 183 (density = 0.1 g/cm³) | 1037 [467%] (density = 0.57 g/cm³) |

Table 6 presents data showing the methane adsorption capacities per unit volume of various carbon blacks, at a temperature of 298° K., and 35 atm. pressure. The data show the adsorption capacities on a unit volume basis, both before and after densification. As the data set forth in Table 6 show, there is a large increase in the adsorption capacity per unit volume of each of the densified carbon blacks over the undensified carbon blacks.

TABLE 6

Methane adsorption capacities per unit volume of various carbon blacks, before and after densification (numbers in brackets show the percentage increase over the undensified material)

| Carbon black | Methane adsorption capacity, cm³ STP/cm³ carbon for undensified material | Methane adsorption capacity, cm³ STP/cm³ carbon for uniaxially densified material |
|---|---|---|
| BLACK PEARLS ® 2000 carbon black | 20 (density = 0.12 g/cm³) | 102 [410%] (density = 0.6 g/cm³) |
| CB-1 | 22 (density = 0.14 g/cm³) | 115 [423%] density = 0.72 g/cm³ |
| CB-2 | 20 (density = 0.12 g/cm³) | 102 [410%] (density = 0.61 g/cm³) |
| CB-3 | 17 (density = 0.12 g/cm³) | 95 [459%] density = 0.55 g/cm³ |
| CB-4 | 18 (density = 0.1 g/cm³) | 105 [483%] (density = 0.57 g/cm³) |

Expressed in other units, Table 7 shows the methane adsorption capacity of BLACK PEARLS® 2000 carbon black before and after densification. The gas storage capacity, as shown in Table 7, clearly increases by an amount of from 142% to 402% after densification of the carbon black either by isostatic or uniaxial densification.

TABLE 7

The effect of densification on methane storage capacity (at 3.54 MPa and 298° K. of BLACK PEARLS ® 2000 carbon black)

| Adsorbent | Density, g/cm³ | Specific adsorption, g CH₄/100 g adsorbent | Storage capacity, g CH₄/l adsorbent |
|---|---|---|---|
| Undensified ("fluffy") | 0.12 | 10.7 | 12.8 |
| Isostatically densified in a pin pelletizer | 0.29 | 10.7 | 31 (142%) |
| Uniaxially densified to 100,000 psi | 0.6 | 10.7 | 64.2 402% |

The purpose of the above examples and the data set forth in the associated tables was to demonstrate the superiority of utilizing the densified carbon blacks as adsorbents. Whereas known prior art carbonaceous materials, when densified, are characterized by an increase in adsorption capacity per unit volume of up to 100%, the densified carbon blacks of the present invention show an increase in adsorption capacity for a gas per unit volume of the adsorbent in excess of 100% or more, and reach values of as much as 400% or more, as compared to undensified carbon blacks. The examples provided herein demonstrate the adsorption of various gases on a range of carbon blacks, under various conditions, to show that the present invention is applicable to any carbon black for the adsorption of any gas.

While preferred embodiments have been shown and described, various modifications and substitutions may be made without departing from the spirit and scope of the invention. Accordingly, it is to be understood that the present invention has been described by way of example and not by limitation.

We claim:

1. An adsorbent comprising a densified carbon black, having a methane storage capacity increase per unit volume at 298° K. and 35 atm of at least about 142% compared to an undensified carbon black.

2. The adsorbent of claim 1 wherein the densified carbon black has an increase in density of from about 100% to about 500% over the undensified carbon black.

3. The adsorbent of claim 1 wherein the densified carbon black has a nitrogen surface area of at least about 600 m²/g.

4. The adsorbent of claim 1 wherein the densified carbon black has a DBP of at least about 150 cc/100 g.

5. The adsorbent of claim 1 wherein the densified carbon black has a bulk density of at least about 0.3 g/cm³.

6. The adsorbent of claim 1 wherein the densified carbon black has a micropore volume per cm³ of carbon increase determined by $CO_2$ adsorption at 273° K. over the undensified carbon black of at least about 142%.

7. The adsorbent of claim 1 wherein the densified carbon black is a densified furnace carbon black.

8. The adsorbent of claim 1 wherein the adsorbent is an adsorbent for a gas.

9. The adsorbent of claim 8 wherein the gas comprises methane, butane, nitrogen, or carbon dioxide.

10. The adsorbent of claim 9 wherein the gas is methane.

11. The adsorbent of claim 1 wherein the densified carbon black has an increase in density of from about 100% to about 500% over the undensified carbon black, a nitrogen surface area of at least about 600 m²/g, and a DBP of at least about 150 cc/100 g.

12. The adsorbent of claim 11 wherein the densified carbon black has an increase in methane adsorption per cm³ of carbon at 35 atm and 298° K. over the undensified carbon black of at least about 145%.

13. A process for adsorbing a gas with an adsorbent comprising a densified carbon black, said process comprising the step of contacting said gas with said adsorbent for a sufficient time to adsorb at least a portion of said gas, and wherein said adsorbent has a methane storage capacity increase per unit volume at 298° K. and 35 atm of at least about 142% compared to an undensified carbon black.

14. The process of claim 13 wherein the densified carbon black has an increase in density of from about 100% to about 500% over the undensified carbon black.

15. The process of claim 13 wherein the densified carbon black has a nitrogen surface area of at least about 600 m²/g.

16. The process of claim 13 wherein the densified carbon black has a DBP of at least about 150 cc/100 g.

17. The process of claim 13 wherein the densified carbon black has a bulk density of at least about 0.3 g/cm³.

18. The process of claim 13 wherein the densified carbon black has an increase in methane adsorption per $cm^3$ of carbon at 298° K. and 35 atm over the undensified carbon black of at least about 145%.

19. The process of claim 13 wherein the densified carbon black comprises a densified furnace carbon black.

20. The process of claim 13 wherein the gas comprises methane, butane, nitrogen, or carbon dioxide.

21. The process of claim 20 wherein the gas is methane.

22. The process of claim 13 wherein the densified carbon black has an increase in density of from about 100% to about 500% over the undensified carbon black, a nitrogen surface area of at least about 600 $m^2/g$, and a DBP of at least about 150 cc/100 g.

23. The adsorbent of claim 1, wherein said densified carbon black has a methane storage capacity increase of from about 142% to about 402% compared to an undensified carbon black.

24. The adsorbent of claim 1, wherein said adsorbent has an increase in methane adsorption per $cm^3$ of carbon at 298° K. and 35 atm of at least about 145% compared to an undensified carbon black.

25. The adsorbent of claim 24, wherein said adsorbent has a increase in methane adsorption per $cm^3$ of carbon at 298° K. and 35 atm of from about 145% to about 483% compared to an undensified carbon black.

26. The process of claim 13, wherein said adsorbent has a methane storage capacity increase of from about 142% to about 402% compared to an undensified carbon black.

27. An adsorbent consisting essentially of a densified carbon black.

28. The adsorbent of claim 27, wherein said densified carbon black has a density of at least about 0.29 $g/cm^3$.

29. The adsorbent of claim 27, wherein the densified carbon black has a nitrogen surface area of at least about 600 $m^2/g$.

30. A process for adsorbing a gas with an adsorbent consisting essentially of a densified carbon black, said process comprising the step of contacting said gas with said adsorbent for a sufficient time to adsorb at least a portion of said gas.

31. A process of claim 30, wherein said densified carbon black has a density of at least about 0.29 $g/cm^3$.

* * * * *